(12) United States Patent
Liu et al.

(10) Patent No.: US 8,670,229 B2
(45) Date of Patent: Mar. 11, 2014

(54) HANDHELD ELECTRONIC DEVICE

(75) Inventors: Hsin-Chih Liu, Taoyuna County (TW);
Ta-Wei Liu, Taoyuan County (TW);
Che-Hung Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 162 days.

(21) Appl. No.: 13/239,400

(22) Filed: Sep. 22, 2011

(65) Prior Publication Data
US 2012/0106045 A1 May 3, 2012

(30) Foreign Application Priority Data

Oct. 28, 2010 (TW) ................................ 99136999 A

(51) Int. Cl.
G06F 1/16 (2006.01)
H05K 5/00 (2006.01)
H05K 7/00 (2006.01)
H05K 7/16 (2006.01)
H05K 7/14 (2006.01)
H05K 7/18 (2006.01)

(52) U.S. Cl.
USPC ............ 361/679.39; 361/679.01; 361/679.02; 361/679.05; 361/727; 361/802; 455/575.4

(58) Field of Classification Search
USPC ............ 361/679.01, 679.02, 679.03, 679.04, 361/679.05, 679.39, 679.56, 727, 741, 756, 361/802; 174/542, 365; 379/433.12; 455/575.4
See application file for complete search history.

(56) References Cited

U.S. PATENT DOCUMENTS

2009/0082074 A1* 3/2009 Chen .......................... 455/575.4

FOREIGN PATENT DOCUMENTS

TW M344556 11/2008
TW 201021501 6/2010

OTHER PUBLICATIONS

"Office Action of Taiwan counterpart application", issued on Nov. 11, 2013, p. 1-p. 7.

* cited by examiner

Primary Examiner — Hoa C Nguyen
Assistant Examiner — Binh Tran
(74) Attorney, Agent, or Firm — Jianq Chyun IP Office

(57) ABSTRACT

A handheld electronic device includes a first body, a second body stacked with the first body, a first plate between the first and second body and fixed to the first body, a second plate between the first plate and second body and fixed to the second body, a first locating structure, and a second locating structure. The first plate includes a sliding slot and a rib transversely disposed in the sliding slot and extended along the sliding slot. An edge of the second plate includes a sliding block clamped on the rib, so the second plate can move along the sliding slot. The first locating structure is disposed on the first plate and located on a moving path of the second plate. The second locating member is disposed on the sliding block, and adapted to interfere with the first locating structure on a locking position of the moving path.

17 Claims, 19 Drawing Sheets

HANDHELD ELECTRONIC DEVICE

CROSS-REFERENCE TO RELATED APPLICATION

This application claims the priority benefit of Taiwan application serial no. 099136999, filed on Oct. 28, 2010. The entirety of the above-mentioned patent application is hereby incorporated by reference herein and made a part of this specification.

BACKGROUND OF THE INVENTION

1. Field of the Invention

The application relates to a handheld electronic device and more particularly, to a sliding type handheld electronic device.

2. Description of Related Art

With the current advancement of information technology, it becomes easier and easier to obtain necessary information from daily-used electronic devices. On the other hand, relying on the dramatic improvement of the state of the art, handheld electronic devices are developed to be lighter and slimmer. Being advantaged in portability, handheld electronic devices are popular and broadly used in our daily life.

Various types of cell phones such as bar type, folding type, rotating type, and sliding type, etc. are proposed to meet different preferences and requirements. With respect to a sliding type handheld electronic device, two bodies are slidably coupled together to be operated in an expanding mode and a retracting mode.

Conventional sliding type handheld electronic devices have a connecting mechanism between the upper and lower bodies, allowing the upper and lower bodies to switch from a retraced state and an expanded state. However, since connecting mechanisms include components such as an elastic member or a linkage, connecting mechanisms are disadvantageous towards the lightness and thinness of handheld electronic devices. In addition, overly complex connecting mechanisms may damage the life-span of a handheld electronic device, and will increase the manufacturing cost of the handheld electronic device.

SUMMARY OF THE INVENTION

The application provides a handheld electronic device that utilizes a simple sliding mechanism to allow the upper and lower bodies to slide with respect to each other, and stably present different operating conditions such as a retracted state and an expanded state.

Specifically, the handheld electronic device includes a first body, a second body, a first locating structure, and a second locating structure. The first body is stacked with the second body. The first body includes a sliding slot, and the sliding slot faces the second body. The second body includes a sliding block. The sliding block is slidably disposed in the sliding slot, driving the first body and the second body to be completely stacked or to be mutually away from each other, respectively forming a retracted state or an expanded state. The first locating structure is disposed in the sliding slot. The first locating structure is located on a moving path of the sliding block. The second locating structure is disposed on the sliding slot, wherein the second locating structure is adapted to be interfered with the first locating structure on a locking position of the moving path.

Based on the above, the application provides a sliding mechanism between two bodies, so the two bodies can slide relative to each other. In addition, a locating structure is disposed on the moving path of the two bodies, to stably present different operation states, such as a retracted state or an expanded state. The application provides a sliding mechanism that can be regarded as a manual sliding hinge. Even though it omits the elastic member or the linkage, the normal operations of the handheld electronic device are maintained, which is advantageous towards the lightness and thinness of the handheld electronic device. In addition, the simplicity of the sliding mechanism design is more reliable, which can lengthen the life-span of the handheld electronic device, and will decrease the manufacturing cost of the handheld electronic device.

In order to make the aforementioned and other features and advantages of the application more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

The following embodiments describe different forms of embodiments of the handheld electronic device of the application. Multiple structures of the embodiments are obtained by adjusting the configuration and position of a locating structure. After reviewing the following embodiments, one having ordinary skill in the art should be able to assemble, fine tune, or omit adjustable parameters under the technical level within a reasonable scope, to satisfy practical needs. In addition, under certain circumstances, the figures of the following embodiments adopt the same reference numbers to represent similar components, providing a consistent and clear description.

Figure 1A:
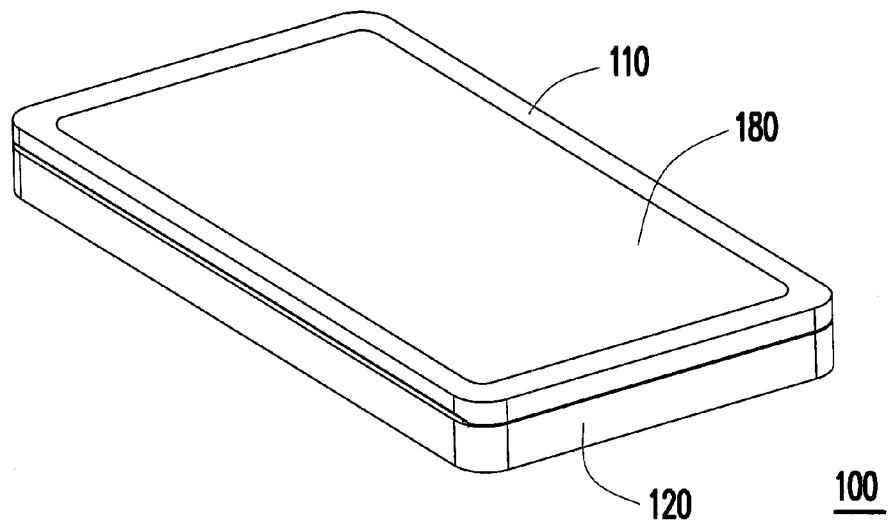
FIG. 1A and FIG. 1B are operation schematic diagrams of a handheld electronic device of the application.
Figure 1B:
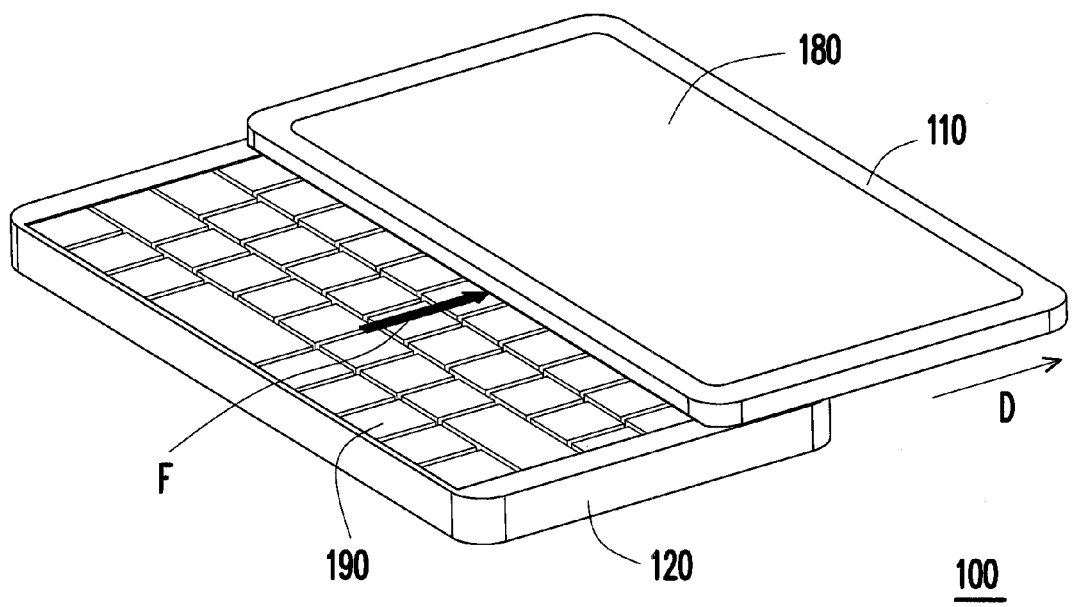

FIG. 1A and FIG. 1B are operation schematic diagrams of a handheld electronic device of the application. The handheld electronic device 100 may be a sliding type cell phone, a PDA, a notebook computer or other similar electronic devices.

As shown in FIG. 1A, the handheld electronic device 100 is in a retracted state. The second body 120 is stacked on the first body 110, and the first body 110 is located on top of the second body 120. Then, as shown in FIG. 1B, a lateral force F is applied on the first body 110 by the user, causing the first body 110 to move horizontal to the second body 120 along a direction D, and the first body 110 will slide on top and protrude from a side of the second body 120. At this point, the first body 110 will expose a partial portion of the top of the second body 120, causing the handheld electronic device 100 to be in an expanded state.

In general, the first body 110 is provided with a display screen 180 for displaying image or text information, and the second body 120 is provided with a keyboard 190 or other possible components, for a user to input information. The present embodiment is not limited thereto. With the development and various functions of the electronic device 100, the display screen 180 may further be a touch screen, whereby the user can input information by a touch manner and perform operations back and forth between the first body 110 and the second body 120. In other embodiments not shown, both the first body 110 and the second body 120 may be provided with display panels, so as to achieve a synchronous display dual screen or a touch operation function.

In order to combine the first body 110 and the second body 120, a connecting member may be disposed between the two bodies, such as two mutually sliding plates. The two plates respectively connect the first body 110 and the second body 120, so that the first body 110 slides relative to the second body 120. The figures of the following embodiments omit the first body 110 and the second body 120 to more clearly describe the design of the sliding mechanism of the present application.

Figure 2:
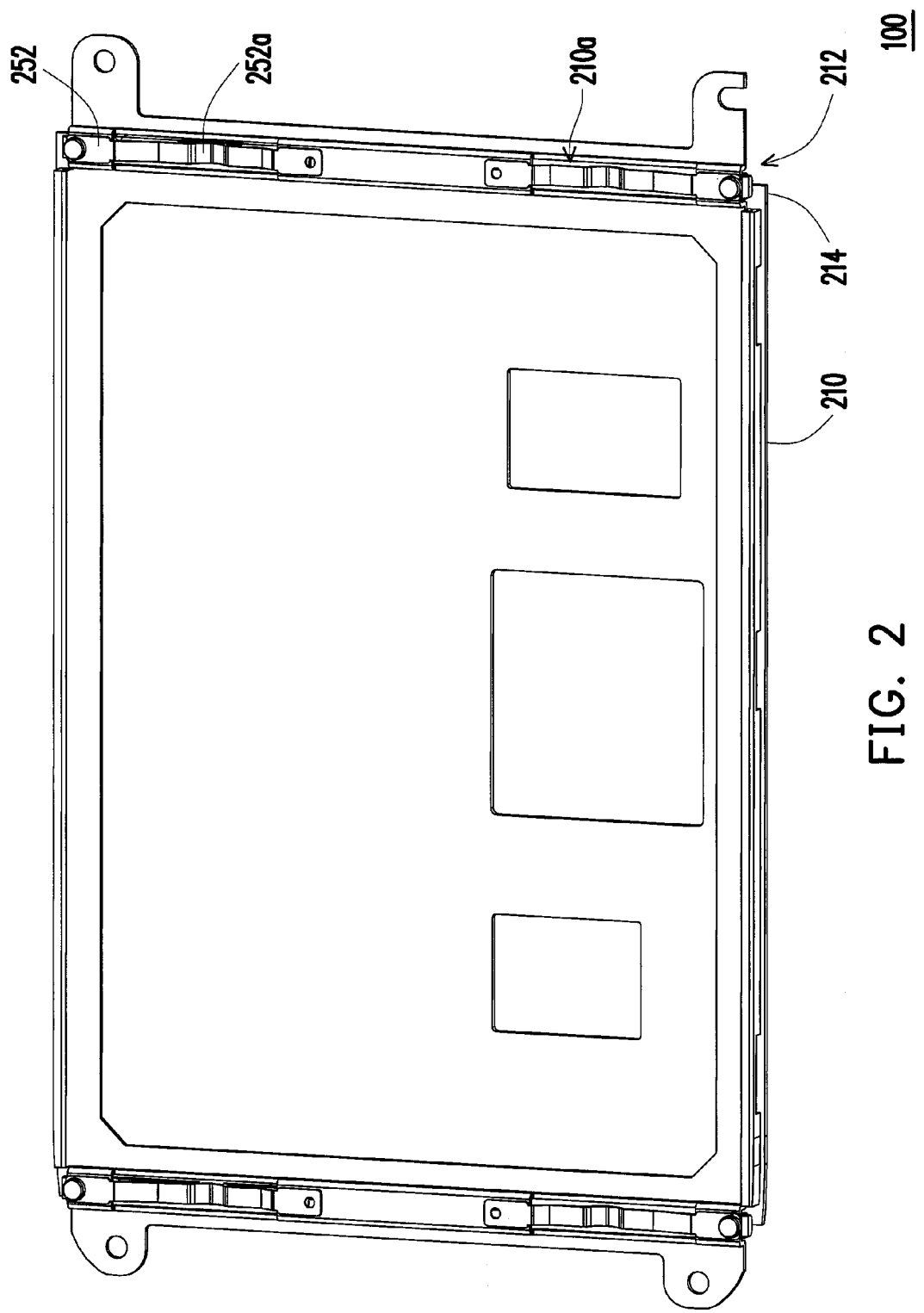
FIG. 2 is a three-dimensional schematic view of a handheld electronic device of an embodiment of the invention.
Figure 3:
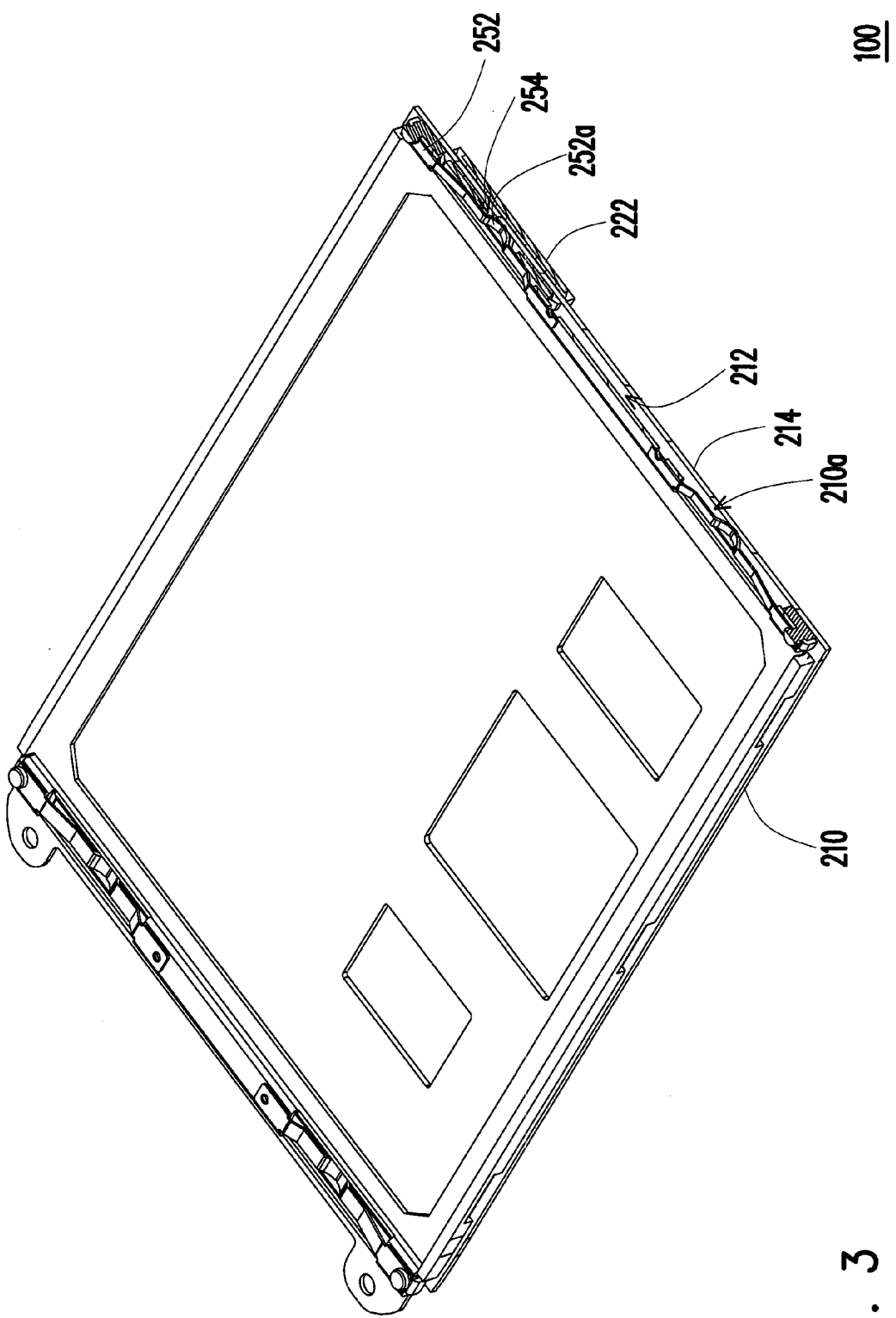
FIG. 3 illustrates a cross-sectional structure of the handheld electronic device of FIG. 2.
Figure 4:
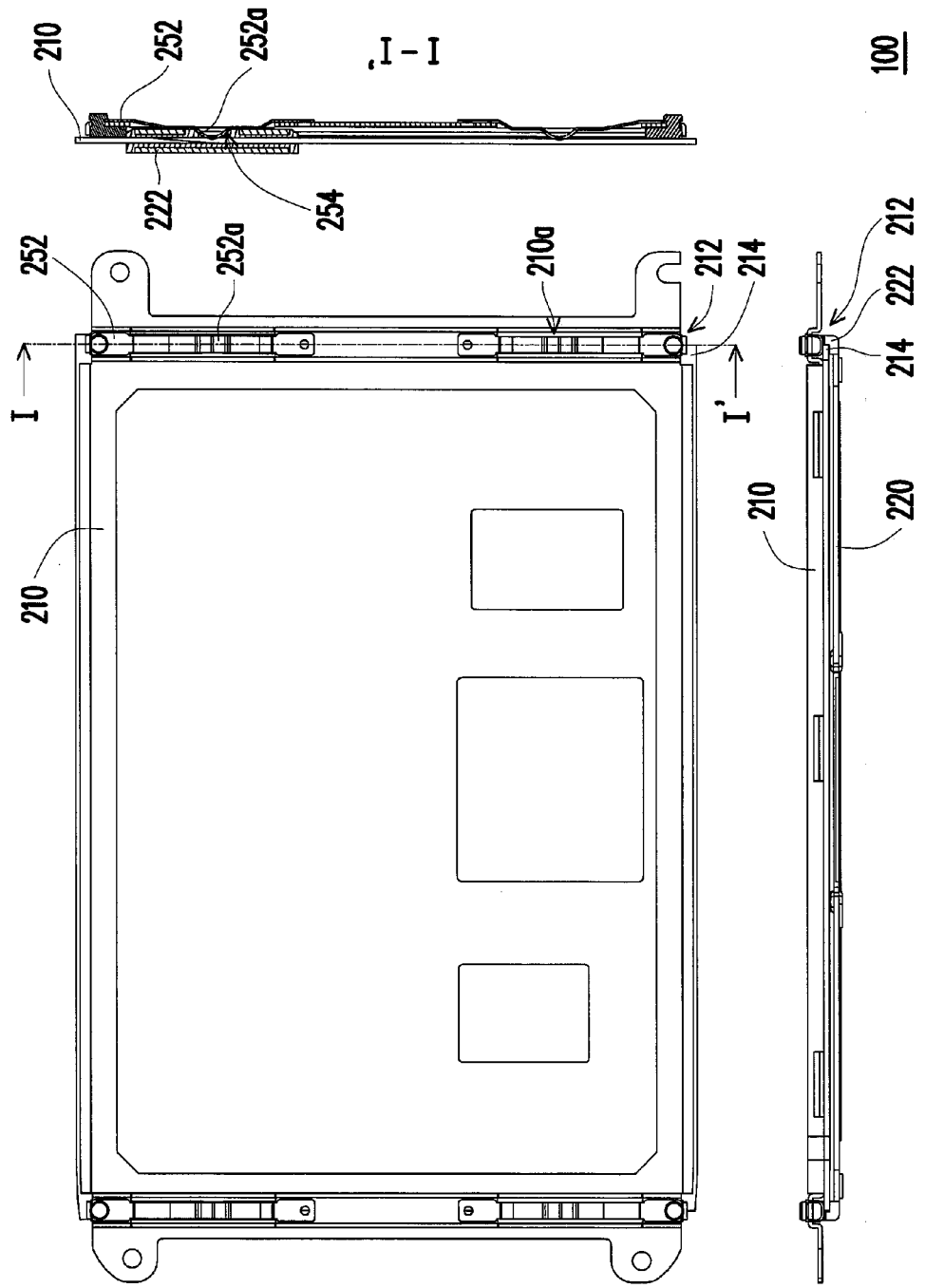
FIG. 4 includes a top view, a side view, and a cross-sectional view along line I-I' of the handheld electronic device of FIG. 2.
Figure 5:
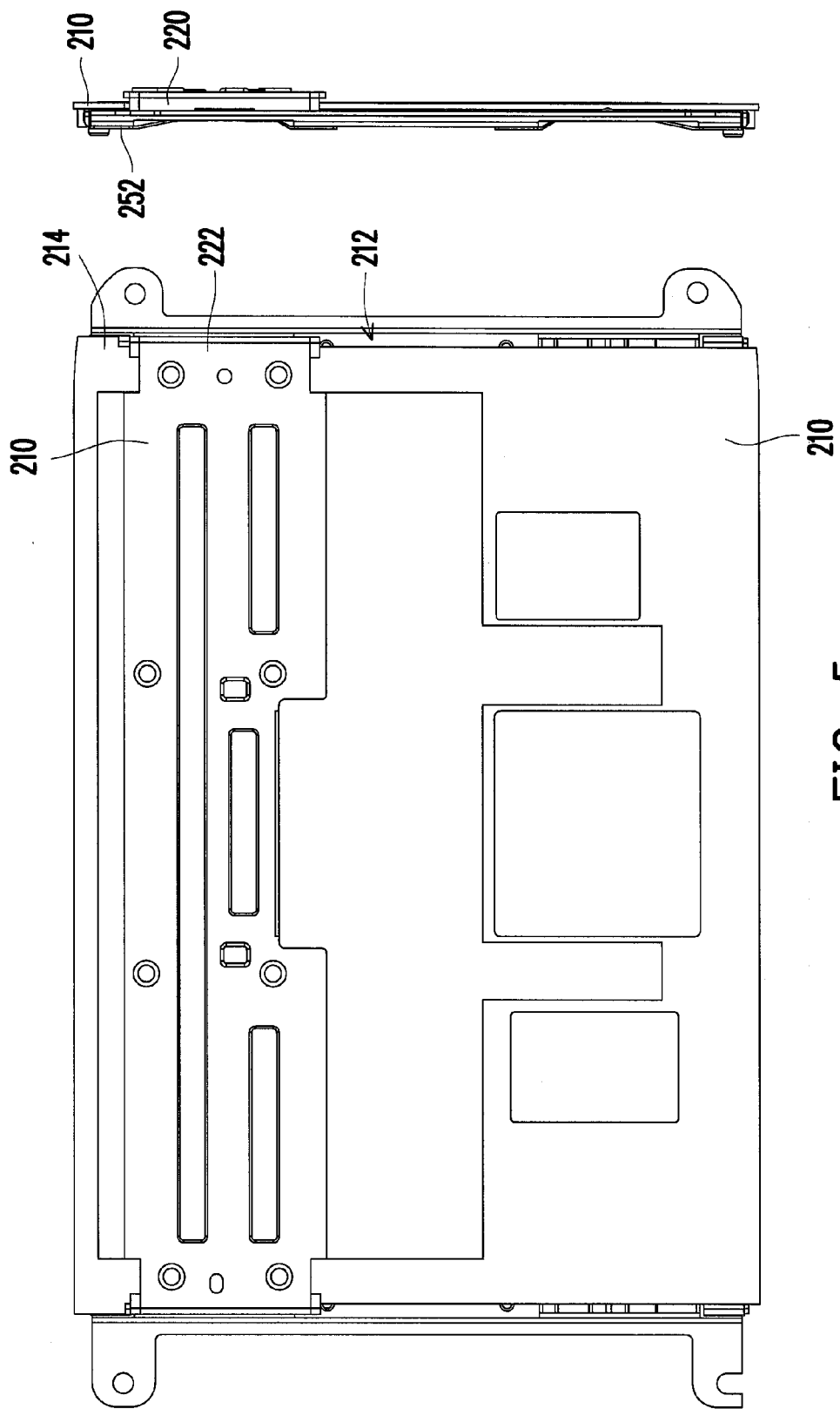
FIG. 5 includes a bottom view and a side view of the handheld electronic device of FIG. 2.

FIG. 2 is a three-dimensional schematic view of a handheld electronic device of an embodiment of the invention. FIG. 3 illustrates a cross-sectional structure of the handheld electronic device of FIG. 2. FIG. 4 includes a top view, a side view, and a cross-sectional view along line I-I' of the handheld electronic device of FIG. 2. FIG. 5 includes a bottom view and a side view of the handheld electronic device of FIG. 2.

Referring to FIG. 1 to FIG. 5, the handheld electronic device 100 includes the first body 110, the second body 120 shown in FIG. 1A and FIG. 1B, and a first plate 210, and a second plate 220. The first plate 210 and the second plate 220 are located between the first body 110 and the second body 120, wherein the first plate 210 is fixed to the first body 110, and the second plate 220 is fixed to the second body 120.

The sliding mechanism of the embodiment includes two sliding slots 212 and two ribs 214 located on the first plate 210, and two sliding blocks 222 on the second plate 220. The two sliding slots 212 are parallel to each other, and are located on a side of the first plate 210 facing the second body 120. The two sliding slots 212 are, for example, strip-shaped grooves formed by shaping the first plate 210. The extension direction of the sliding slots 212 are, for example, parallel to the direction D of FIG. 1B. The ribs 214 are respectively transversely disposed in the corresponding sliding slot 212 and extended along the sliding slot 212. The sliding blocks 222 are located on the two ends of the second plate 220, and are respectively slidably disposed in the corresponding sliding slot 212. The second plate 220 clamps the corresponding rib 214 by way of the sliding blocks 222, causing the second plate 220 to move relative to the first plate 210 along the sliding slots 212. This drives the first body 110 to be completely stacked on the second body 120 to show the retracted state in FIG. 1A, or to be mutually away from each other to show the expanded state of FIG. 1B.

Figure 6:
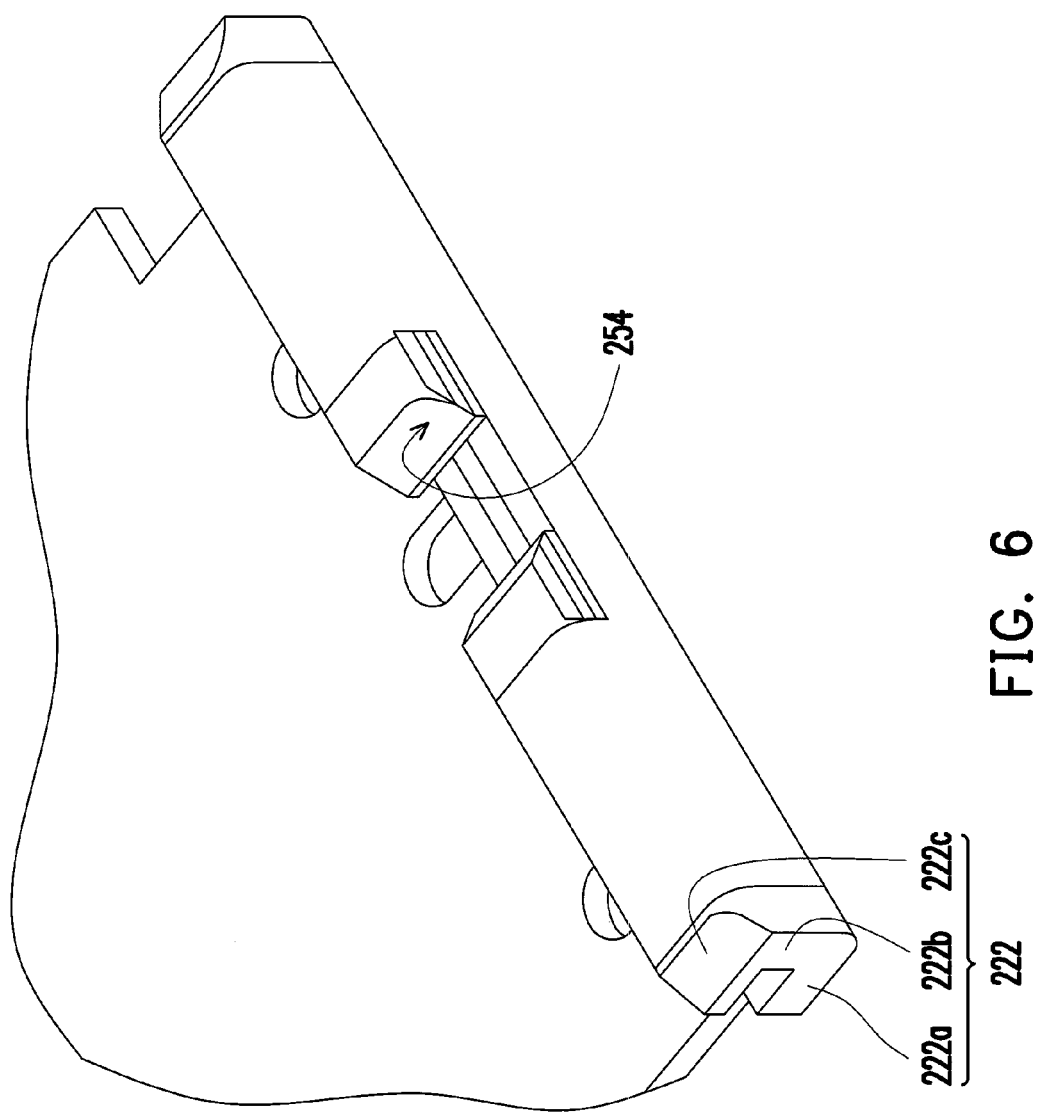
FIG. 6 is a partial enlarged view of a second plate of the handheld electronic device of FIG. 2.

In further detail, FIG. 6 is a partial enlarged view of the second plate 220. The sliding block 222 includes a base plate 222a, a side wall 222b, and a top plate 222c. The base plate 222a is the portion that extends horizontally from the edge of the second plate 220. The side wall 222b is disposed upright on an edge of the bottom plate 222a. The top plate 222c is connected to the side wall 222b. The top plate 222c and the bottom plate 222a are substantially parallel to each other, to jointly clamp the rib 214.

The embodiment further disposes a locating structure on the moving path of the first plate 210 and the second plate 220, to stably present different operating states. For example, a first locating structure is disposed on the first plate 210, and is located on the moving path of the second plate 220. A second locating structure is disposed on the sliding block 222 of the second plate 220 to match with the first locating structure. This causes the second locating structure to interfere with the first locating member on a locking position of the moving path. In other words, when the second plate 220 drives the second body 120 to move to the locking position relative to the first body 110 and the first plate 210, the interference between the first locating structure and the second locating structure can lock the relative positioning between the first body 110 and the second body 120. The locking position can be designed as a position when the handheld electronic device 100 is in a retracted state, an expanded state, or another operating state.

Specifically, an elastic piece 252 is disposed on each of the two corresponding locking positions of the two sliding slots 212, respectively, serving as the first locating structure. The first plate 210 includes an opening 210a, to expose the sliding block 222 in the sliding slot 212. The elastic piece 252 is located on the outer side of the sliding slot 212, and the two ends of the elastic piece 252 are fixed to the first plate 210. The elastic piece 252 further includes a protruding portion 252a suspended between the two ends, passes through the opening 210a of the first plate, and protrudes into the sliding slot 212. In the embodiment, the protruding portion 252a is, for example, a convex hull formed through a bending of the elastic piece 252.

In addition, in the embodiment, a locating recess 254 is formed on the sliding block 222, facing the sliding slot 212. The locating recess 254 serves as the second locating structure. The locating recess 254 is located on the top plate 222c, and the locating recess 254 faces a direction perpendicular to the planar direction of the top plate 222c (i.e. top plate extension direction). In the embodiment, the locating recess 254 faces the first body 110, and the elastic piece 252 is disposed on the top portion of the sliding slot 212. Thus, when the protruding portion 252a of the elastic piece 252 on the sliding block 222 of the second plate 220 moves to the two locking positions of the two ends of the sliding slot 212, it engages the locating recess 254.

Through the elastic piece 252 and the locating recess 254, the user will have a better use and feel of the handheld electronic device 100. In further detail, when the first body 110 and the second body 120 present a retracted state, the mutually engaged elastic piece 252 and the locating recess 254 can provide a locating effect, to lock the relative position between the first body 110 and the second body 120. When the user wants the first body 110 and the second body 120 to be in an expanded state, the user needs to exert a lateral force F that can overcome the engaging effect between the elastic piece 252 and the locating recess 254 (shown in FIG. 1B), to undo the interference between the first body 110 and the second body 120. This causes the first body 110 to move horizontally along a direction D relative to the second body 120. Afterwards, when the handheld electronic device 100 is completely expanded and is in an expanded state, the locating recess 254 of the sliding block 222 will interfere with the protruding portion 252a of another elastic piece 252 of another end located on the moving path. This will fix the first body 110 and the second body 120 to be in an expanded state.

Figure 7:
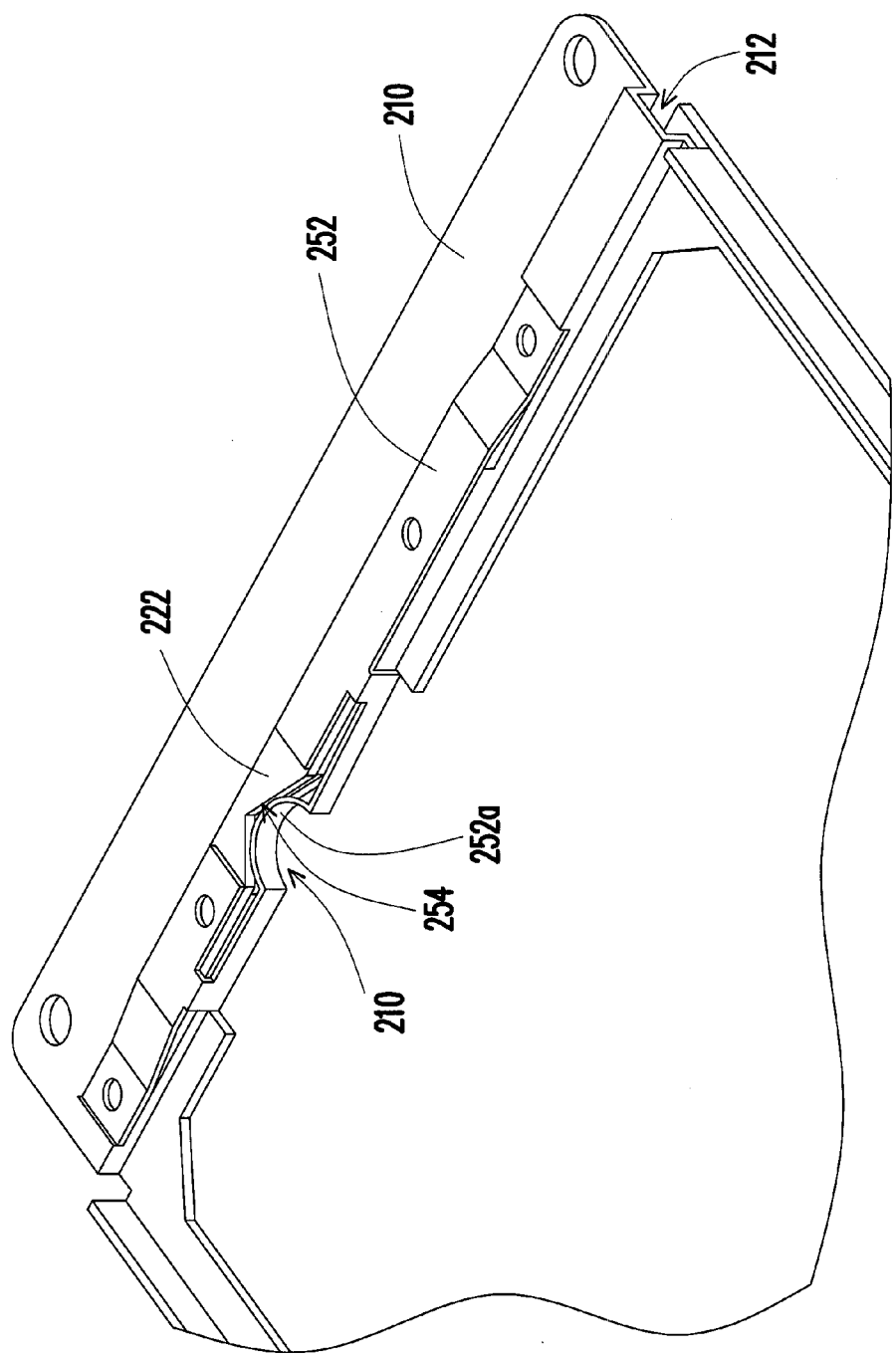
FIG. 7 illustrates a partial structure of a handheld electronic device according to another embodiment of the invention.
Figure 8:
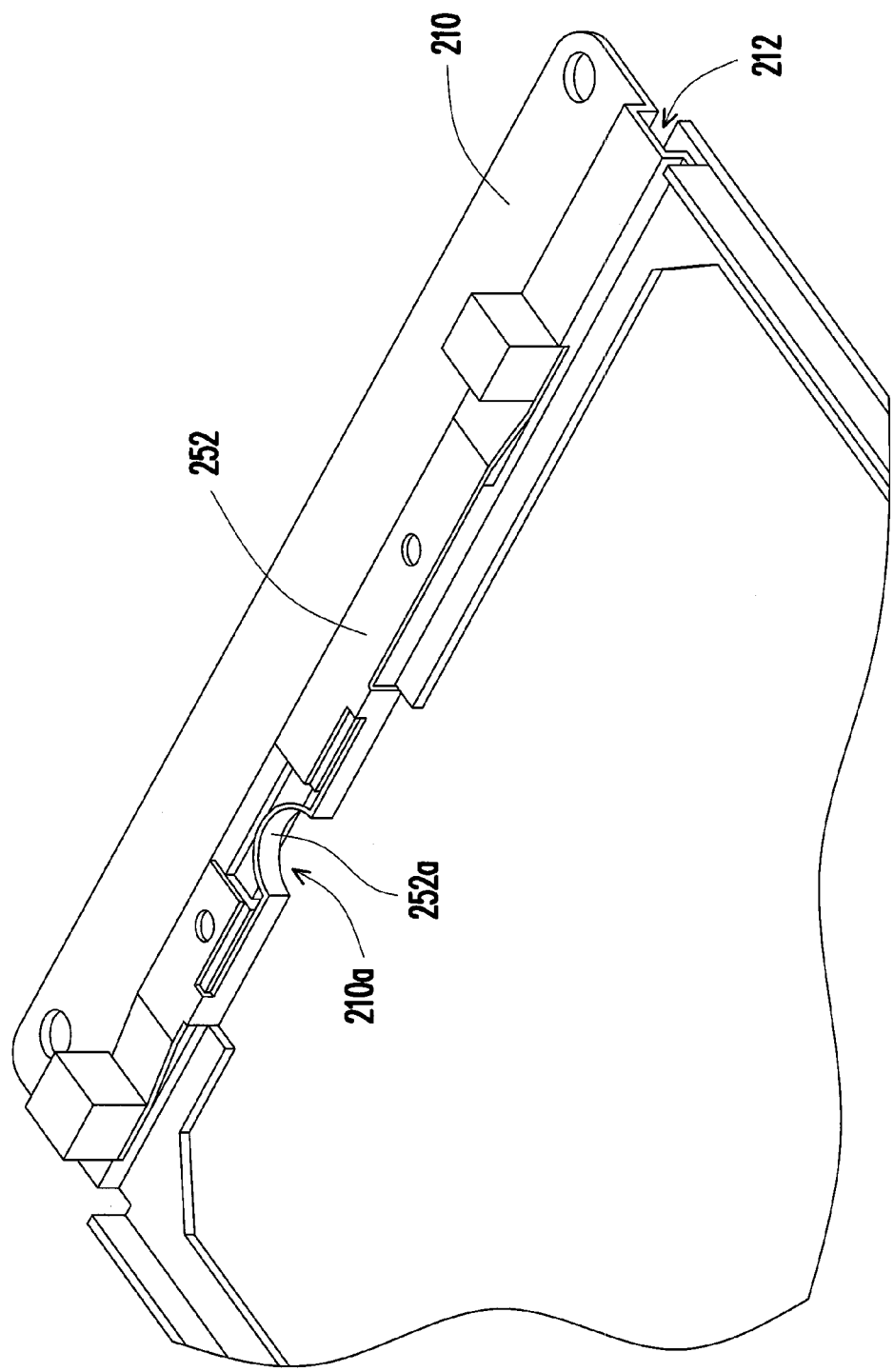
FIG. 8 and FIG. 9 respectively illustrate the partial structure of the first plate and the partial structure of the second plate of FIG. 7.
Figure 9:
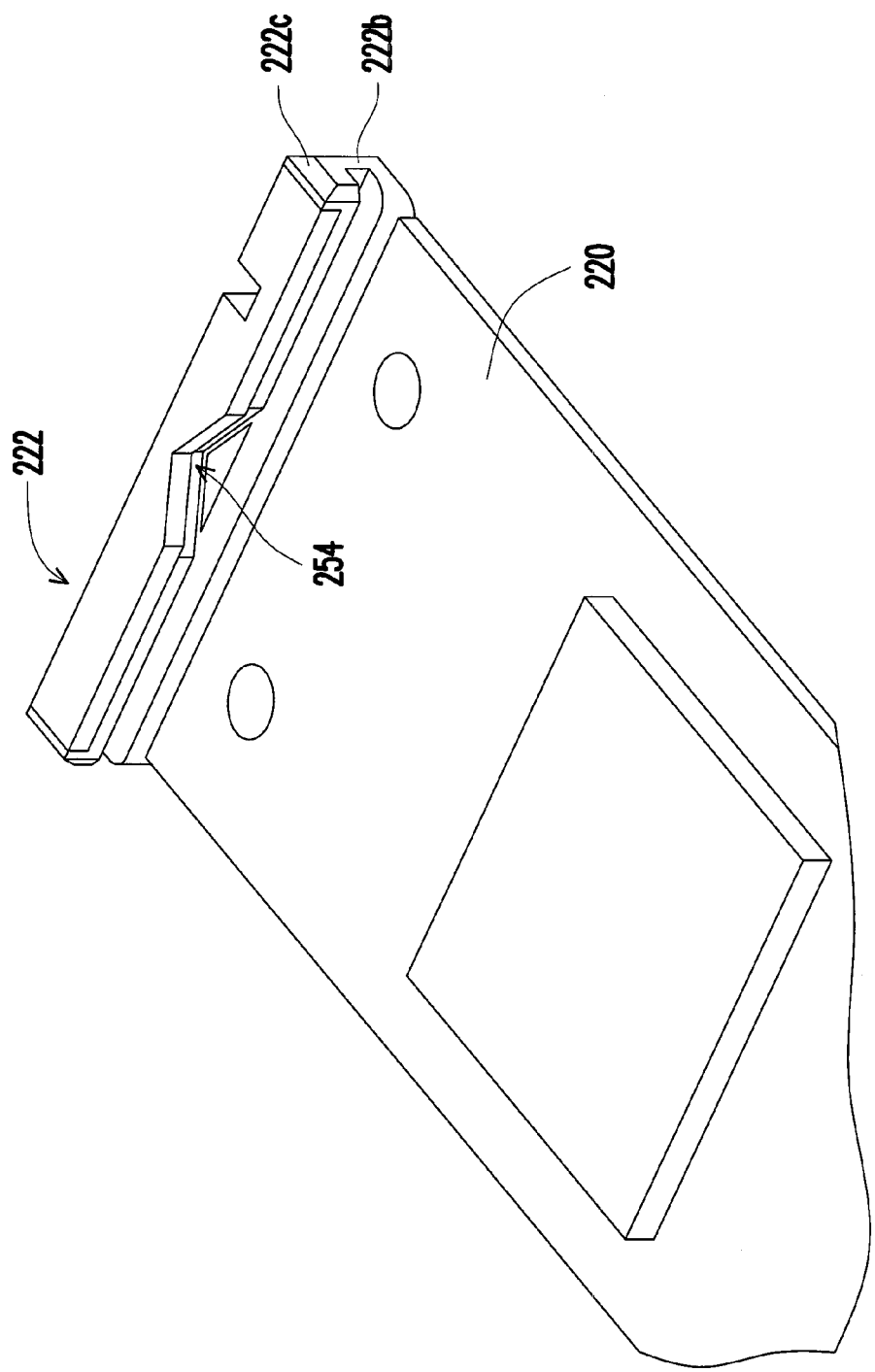

The application does not limit the position of the locating recess 254 on the sliding block 222, and the position of the corresponding elastic piece 252 on the first plate 210. FIG. 7 illustrates a partial structure of a handheld electronic device according to another embodiment of the invention. FIG. 8 and FIG. 9 respectively illustrate the partial structure of the first plate 210 and the partial structure of the second plate 220. As seen in FIG. 7 to FIG. 9, the locating recess 254 of the embodiment is disposed on an end of the top plate 222c of the sliding block 222 away from the side wall 222b. The locating recess 254 faces a direction parallel to the planar direction of the top plate 222c. Correspondingly, the opening 210a is located on the side wall of the sliding slot 212, causing the protruding portion 252a of the elastic piece 252 to pass through the opening 210a and protrude into the sliding slot 212. Thus, when the protruding portion 252a of the elastic piece 252 on the sliding block 222 of the second plate 220 moves to the locking position of the sliding slot 212, it engages the locating recess 254.

Figure 10:
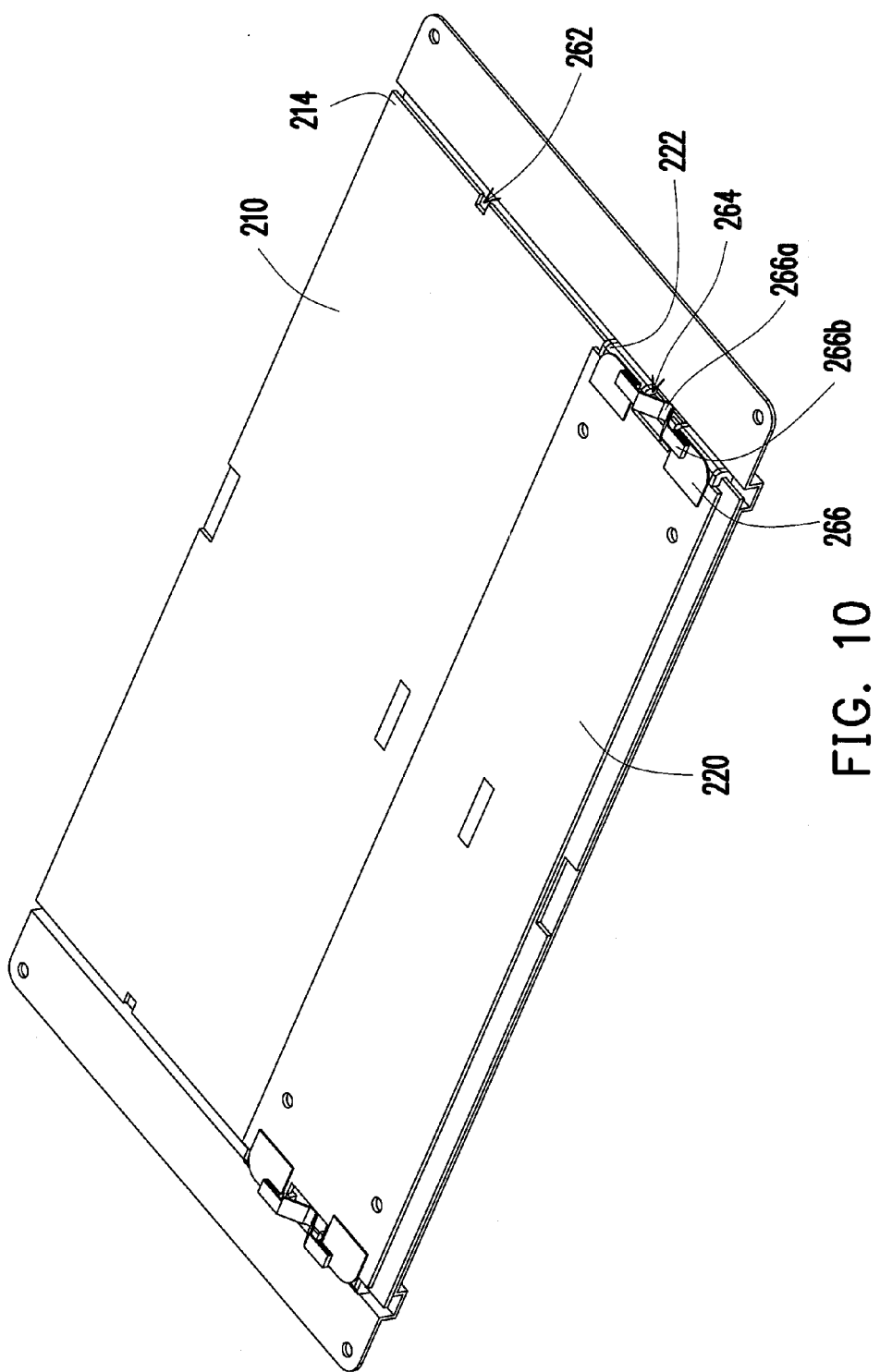
FIG. 10 is a three-dimensional schematic view of a handheld electronic device of yet another embodiment of the invention.
Figure 11:
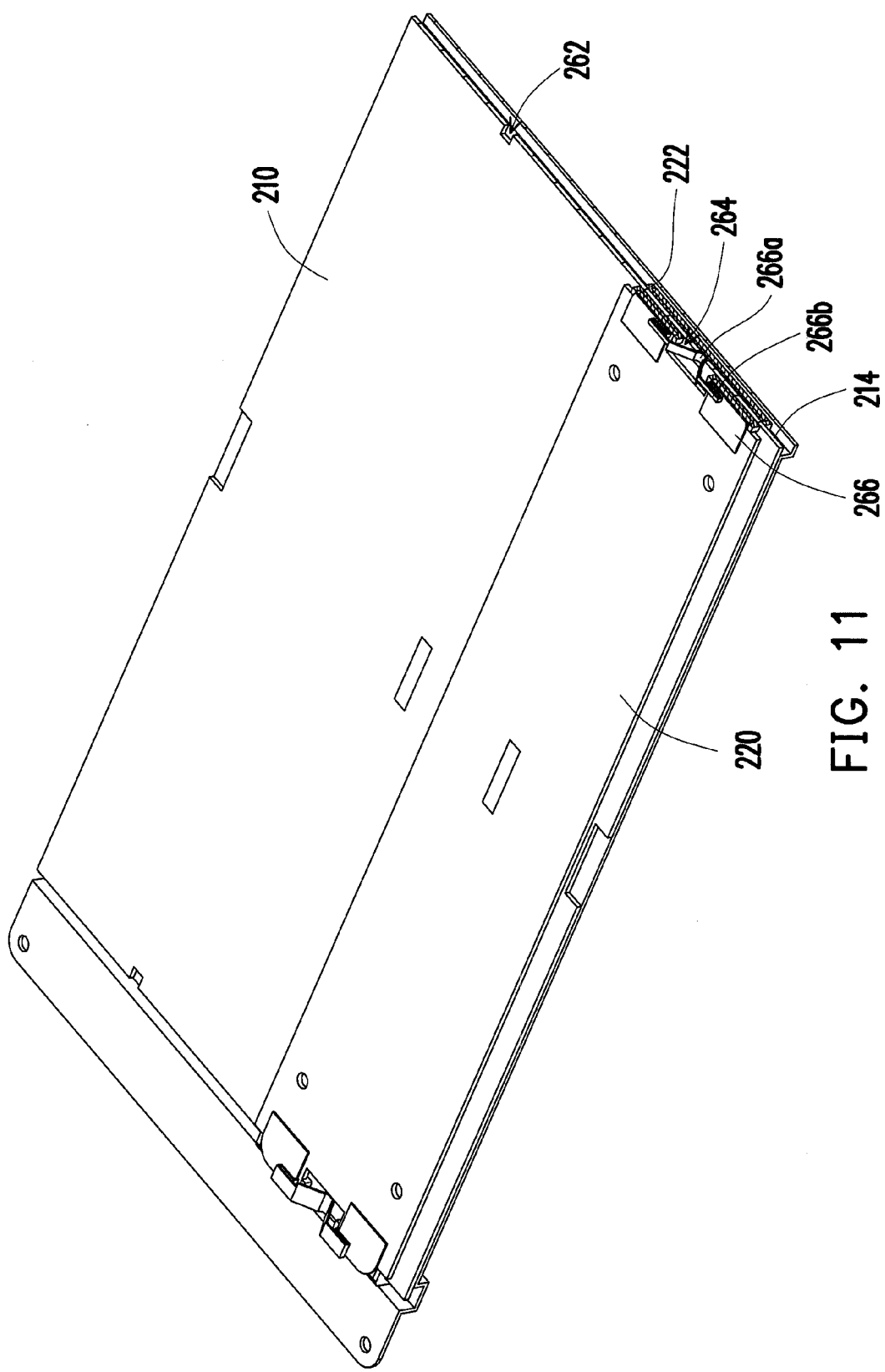
FIG. 11 illustrates a cross-sectional structure of the handheld electronic device of FIG. 10.
Figure 12:
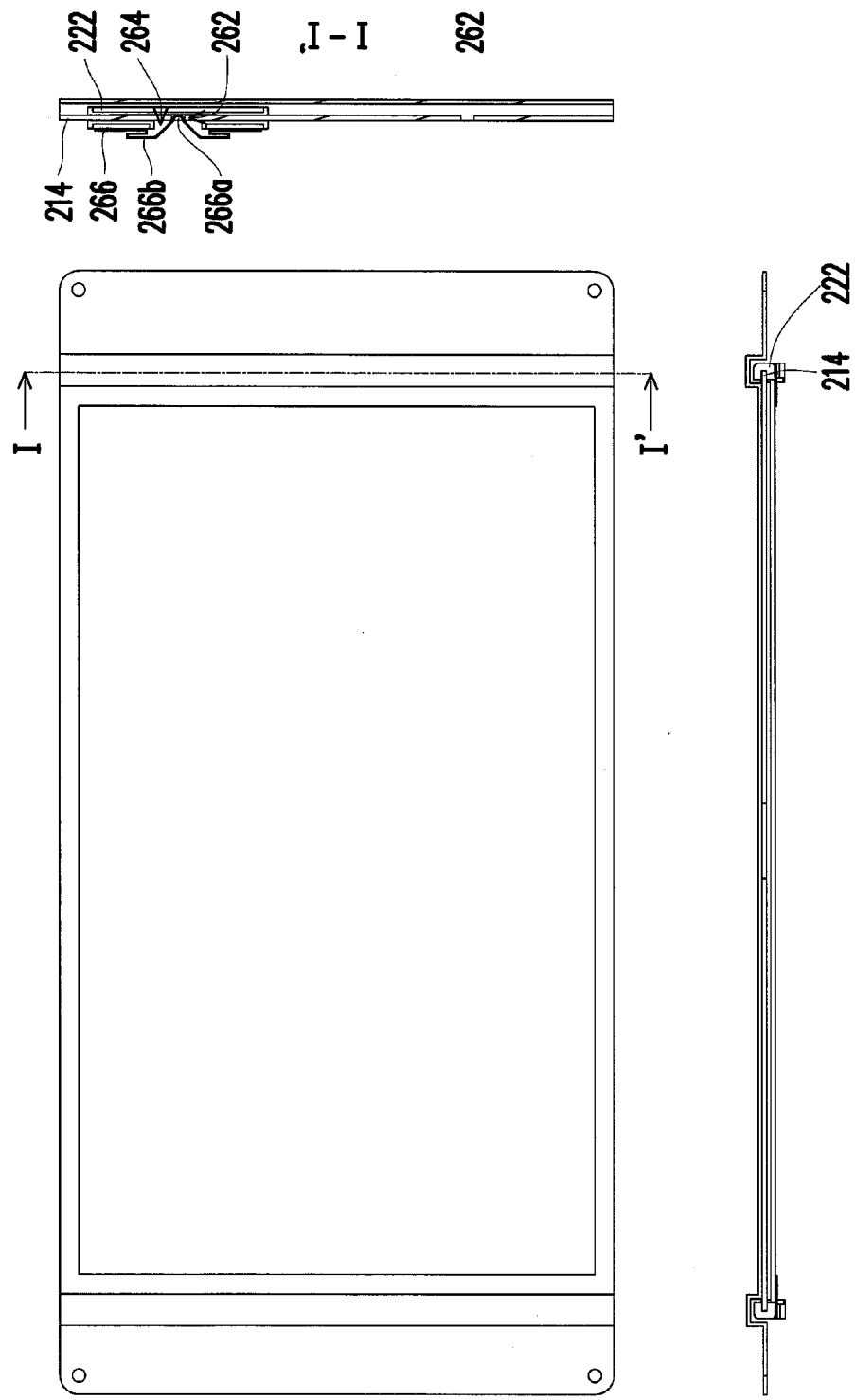
FIG. 12 includes a top view, a side view, and a cross-sectional view along line I-I' of the handheld electronic device of FIG. 10.
Figure 13:
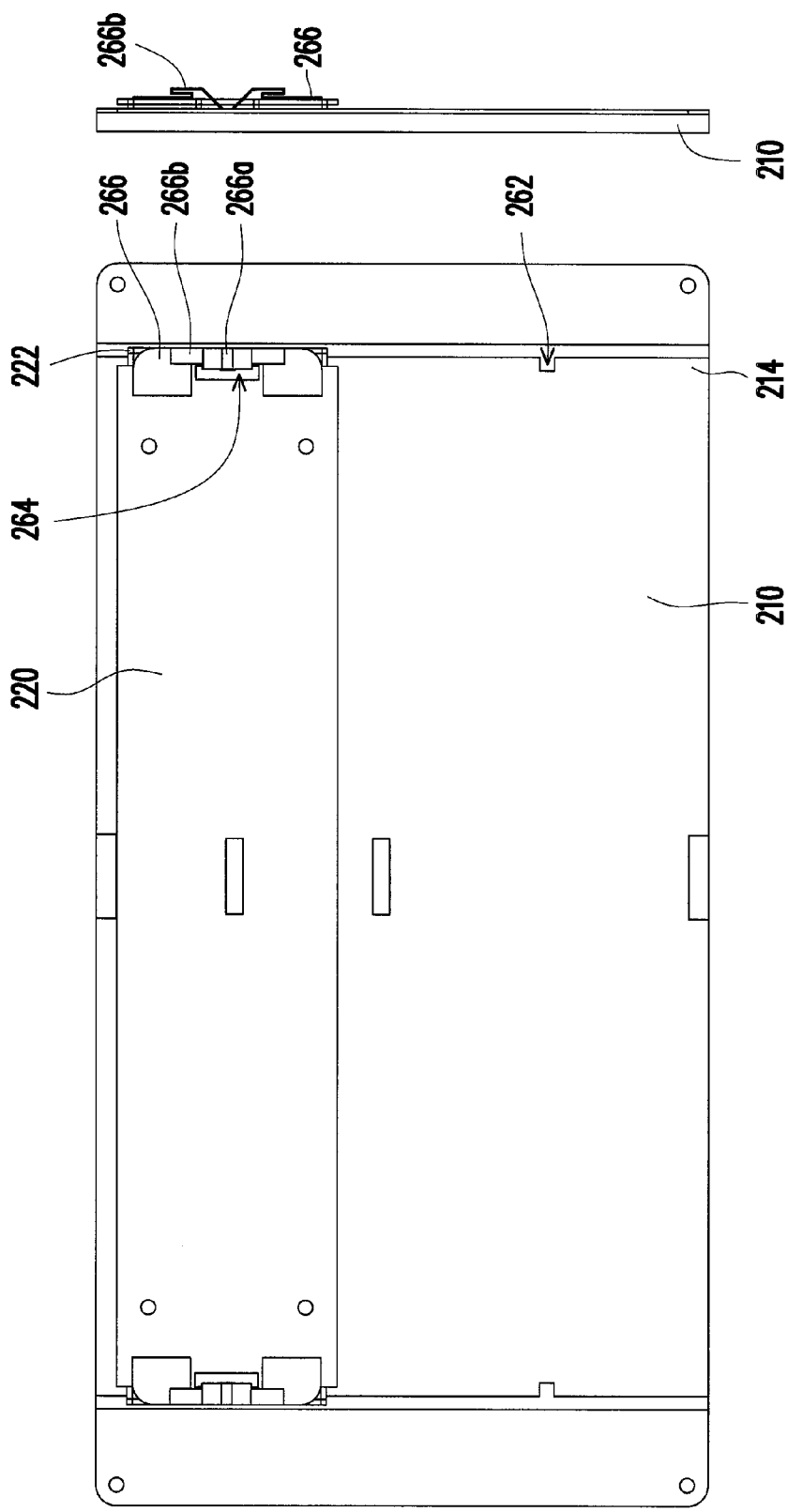
FIG. 13 includes a bottom view and a side view of the handheld electronic device of FIG. 10.

FIG. 10 is a three-dimensional schematic view of a handheld electronic device of yet another embodiment of the invention. FIG. 11 illustrates a cross-sectional structure of the handheld electronic device of FIG. 10. FIG. 12 includes a top view, a side view, and a cross-sectional view along line I-I' of the handheld electronic device of FIG. 10. FIG. 13 includes a bottom view and a side view of the handheld electronic device of FIG. 10. The main difference between the embodiment and the embodiment of FIGS. 2-6 is the configuration and the position of the locating structure. In further detail, in the embodiment, the first locating structure includes a locating recess 262 located on the rib 214, and the second locating structure includes an opening 264 and an elastic piece 266 located on the sliding block. The opening 264 exposes the rib 214, and the elastic piece 266 is located on the outer side of the sliding block 222. Two ends of the elastic piece 266 are fixed on the sliding block 222 at the two sides of the opening 264, and the elastic piece 266 includes a protruding portion 266a suspended between the two ends. The protruding portion 266a passes through the opening 264 and leans on the rib 214. The protruding portion 266a is adapted to engage the locating recess 262 on the rib 214 on the locking position.

In the embodiment, the protruding portion 266a is, for example, a convex hull formed through a bending of the elastic piece 266. In addition, a zigzag connecting portion 266b is formed between the protruding portion 266a and the two ends of the elastic piece 266. The connecting portion 266b can be pulled and extended along the movement of the protruding portion 266a, causing the protruding portion 266a to have larger flexible margin.

Through the locating recess 262 on the rib 214, the opening 264 on the sliding block 222, and the elastic piece of the embodiment, the same locating effect of the previous embodiment can be achieved. This improves the operation use and feel of the handheld electronic device, and allows the two bodies to stably present different operation states, such as a retracted state or an expanded state. Further, in the embodiment, when the protruding portion 266a of the elastic piece 266 is not in a locking position it can lean against the rib 214, to maintain the gap between the first plate 210 and the second plate 220. In other words, in the majority of the moving path, the protruding portion 266a of the elastic piece 266 will lean against the rib 214, assuring that no loosening or wavering action will happen between the first plate 210 and the second plate 220. This improves the operation stability of the handheld electronic device.

Figure 14:
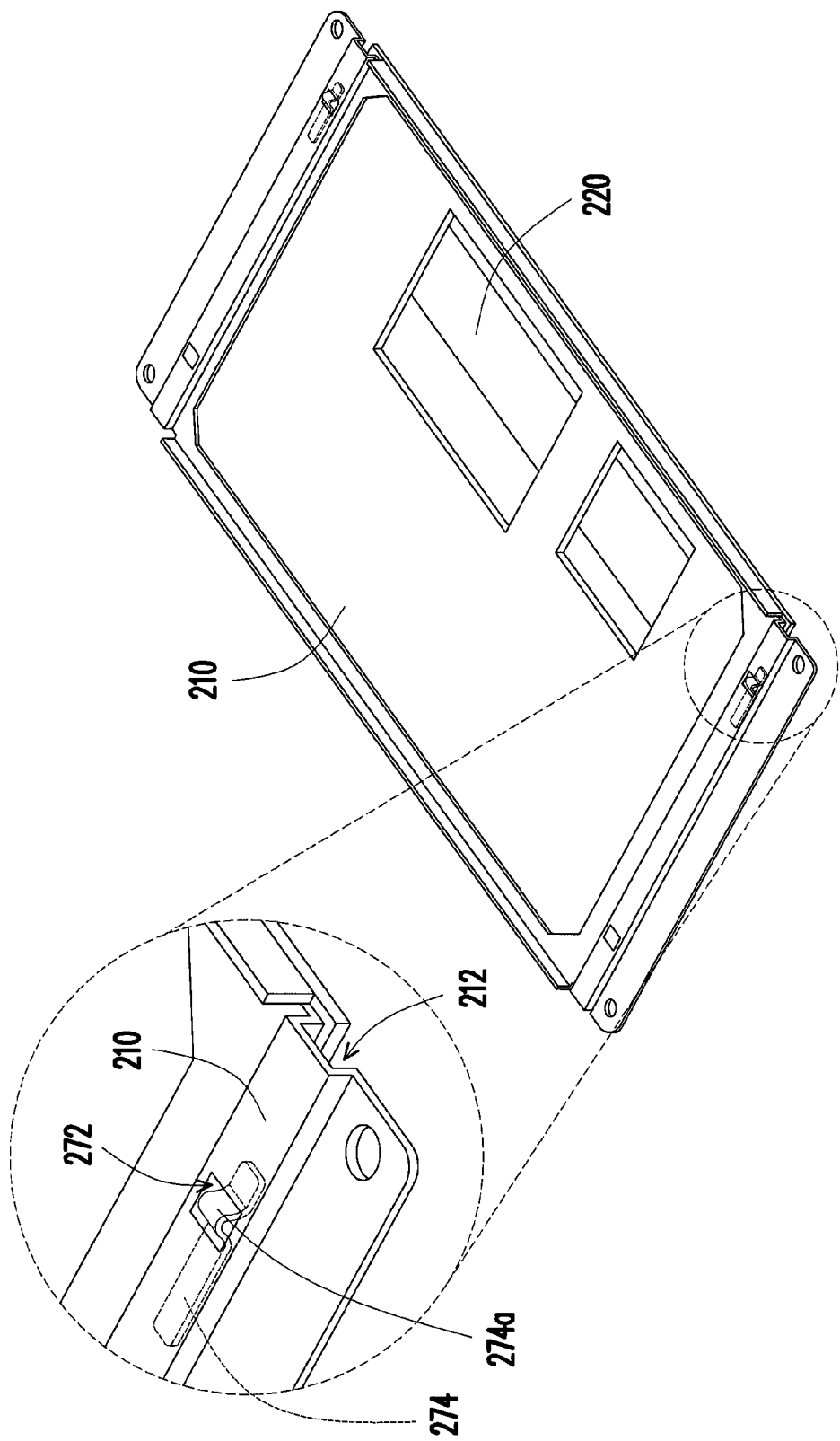
FIG. 14 is a three-dimensional schematic view of a handheld electronic device of still another embodiment of the invention.
Figure 15:
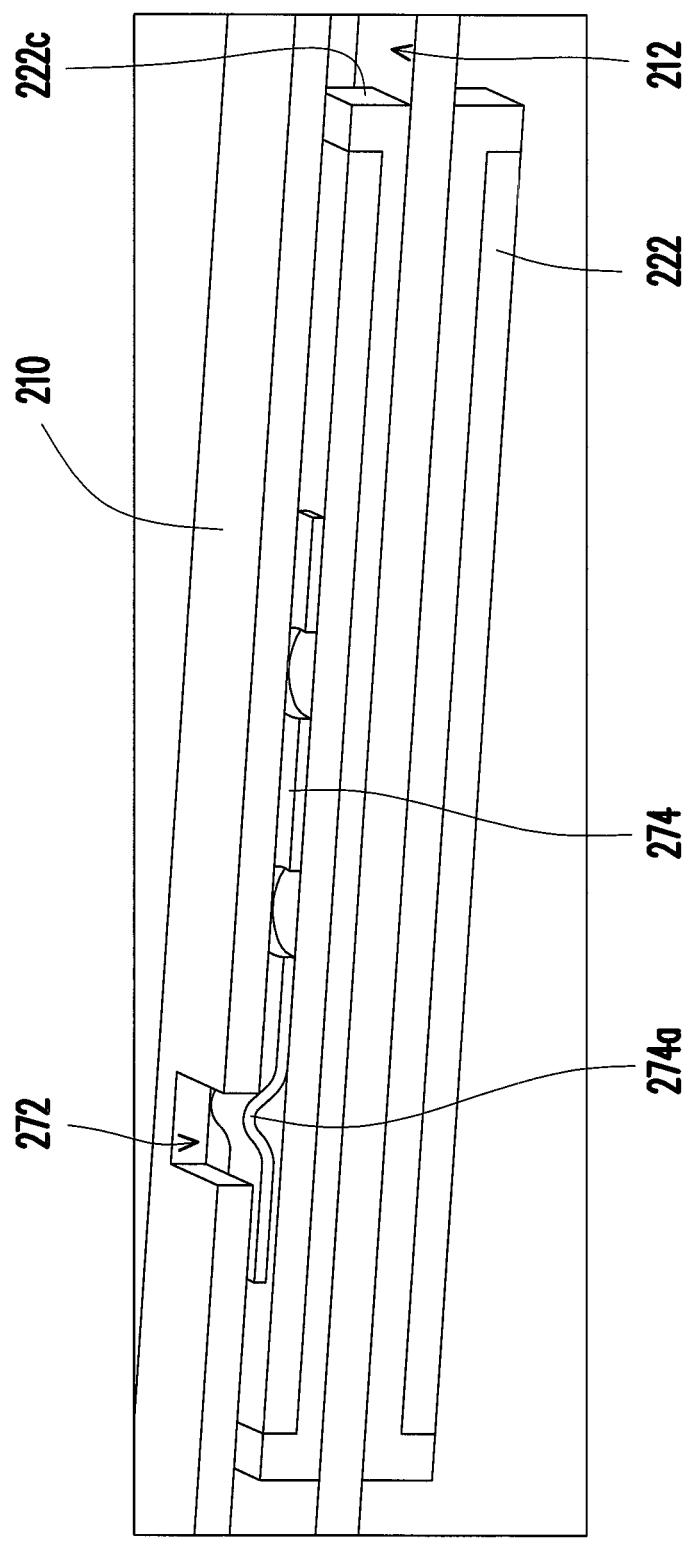
FIG. 15 illustrates a partial cross-sectional structure of the handheld electronic device of FIG. 14.

FIG. 14 is a three-dimensional schematic view of a handheld electronic device of still another embodiment of the invention. FIG. 15 illustrates a partial cross-sectional structure of the handheld electronic device of FIG. 14. The main difference between the embodiment and the previous embodiments is the configuration and the position of the locating structure. In further detail, the first locating structure of the embodiment includes a locating hole 272 located on the first plate 210, and exposing the sliding slot 212. The second locating structure includes an elastic piece 274 located in the sliding slot 212. An end of the elastic piece 274 is, for example, fixed on the top plate 222c of the sliding block 222 of the second plate 220, and the elastic piece 274 has a protruding portion 274a facing the first plate 210. The protruding portion 274a is adapted to engage the locating hole 272 of the first plate 210 on the locking position.

In the embodiment, the protruding portion 274a is, for example, a convex hull formed through a bending of the elastic piece 274. Through the locating hole 272 on the first plate 210 and the elastic piece 274 of the embodiment, the same locating effect of the previous embodiment can be achieved. This improves the operation use and feel of the handheld electronic device, and allows the two bodies to stably present different operation states, such as a retracted state or an expanded state. Further, in the embodiment, when the protruding portion 274a of the elastic piece 274 is not in a locking position it can lean against the inner wall of the sliding slot 212, to maintain the gap between the first plate 210 and the second plate 220. In other words, in the majority of the moving path, the protruding portion 274a of the elastic piece 274 will lean against the inner wall of the sliding slot 212, assuring that no loosening or wavering action will happen between the first plate 210 and the second plate 220. This improves the operation stability of the handheld electronic device.

Figure 16:
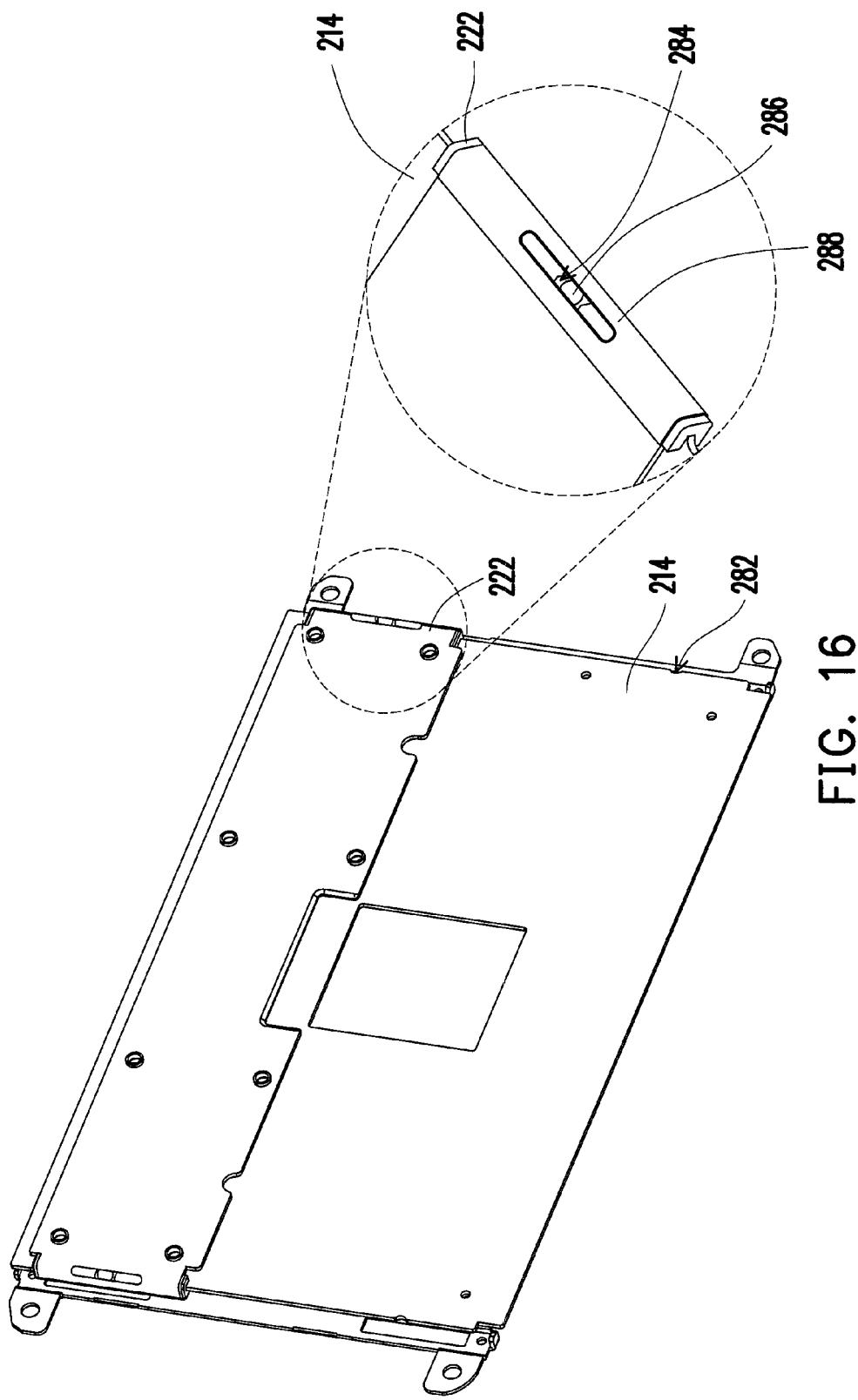
FIG. 16 is a three-dimensional schematic view of a handheld electronic device of another embodiment of the invention.
Figure 17:
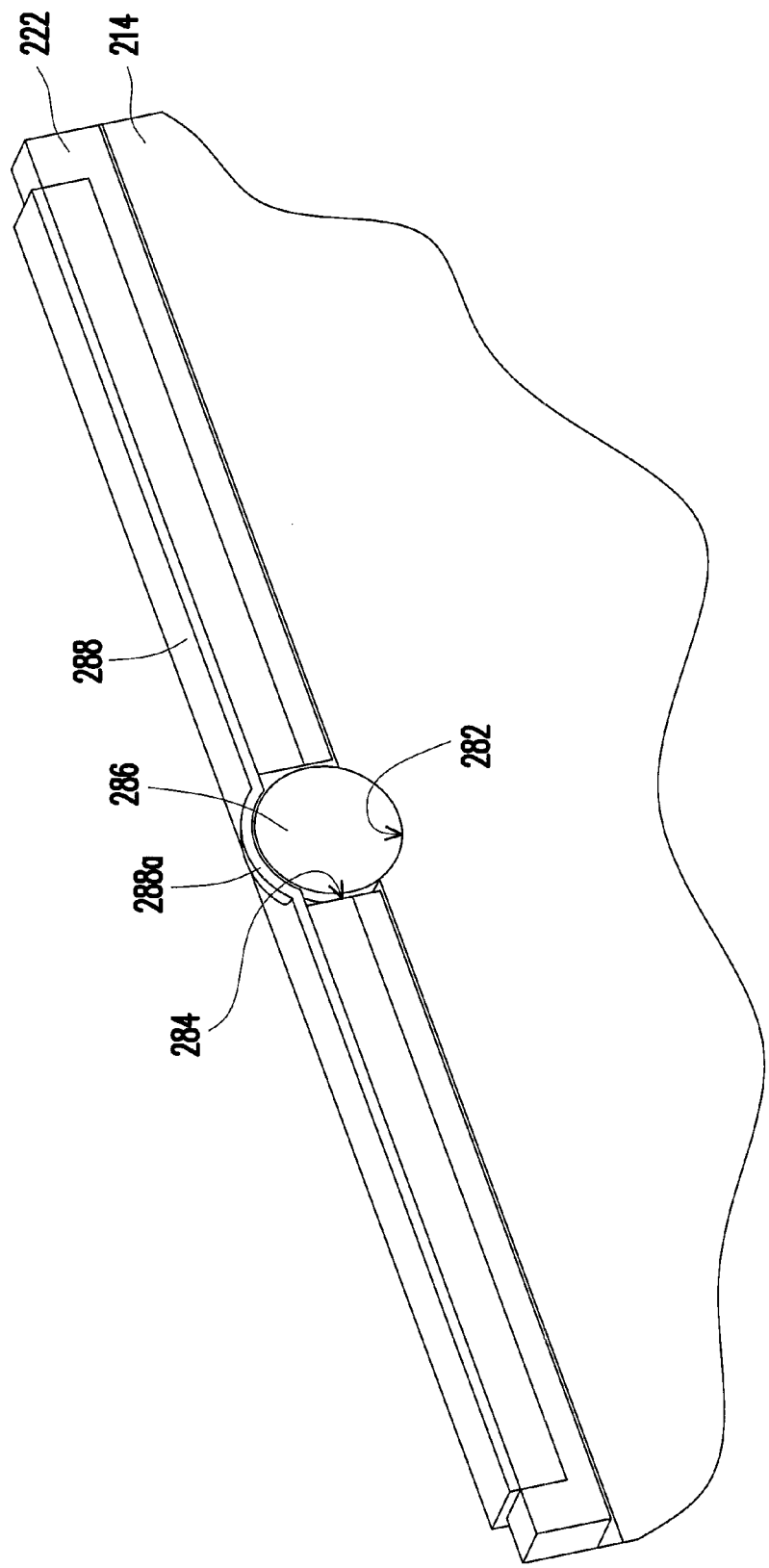
FIG. 17 illustrates a partial cross-sectional structure of the handheld electronic device of FIG. 16.

FIG. 16 is a three-dimensional schematic view of a handheld electronic device of still another embodiment of the invention. FIG. 17 illustrates a partial cross-sectional structure of the handheld electronic device of FIG. 16. The main difference between the embodiment and the previous embodiments is the configuration and the position of the locating structure. In further detail, in the embodiment, the first locating structure includes a locating recess 282 located on the rib 214, and the second locating structure includes an opening 284 located on the sliding block 222, a ball 286 located in the opening 284, and an elastic piece 288 leaning against the ball 286. The opening 284 exposes the rib 214. The elastic piece 288 is located on the outer side of the sliding block 222 and covers at least a portion of the opening 284, and two ends of the elastic piece 288 are fixed on the sliding block 222 at the two sides of the opening 284 to exert a force on the ball 286 towards the rib 214, causing the ball 286 to engage the locating recess 282 on the locking position.

Figure 18:
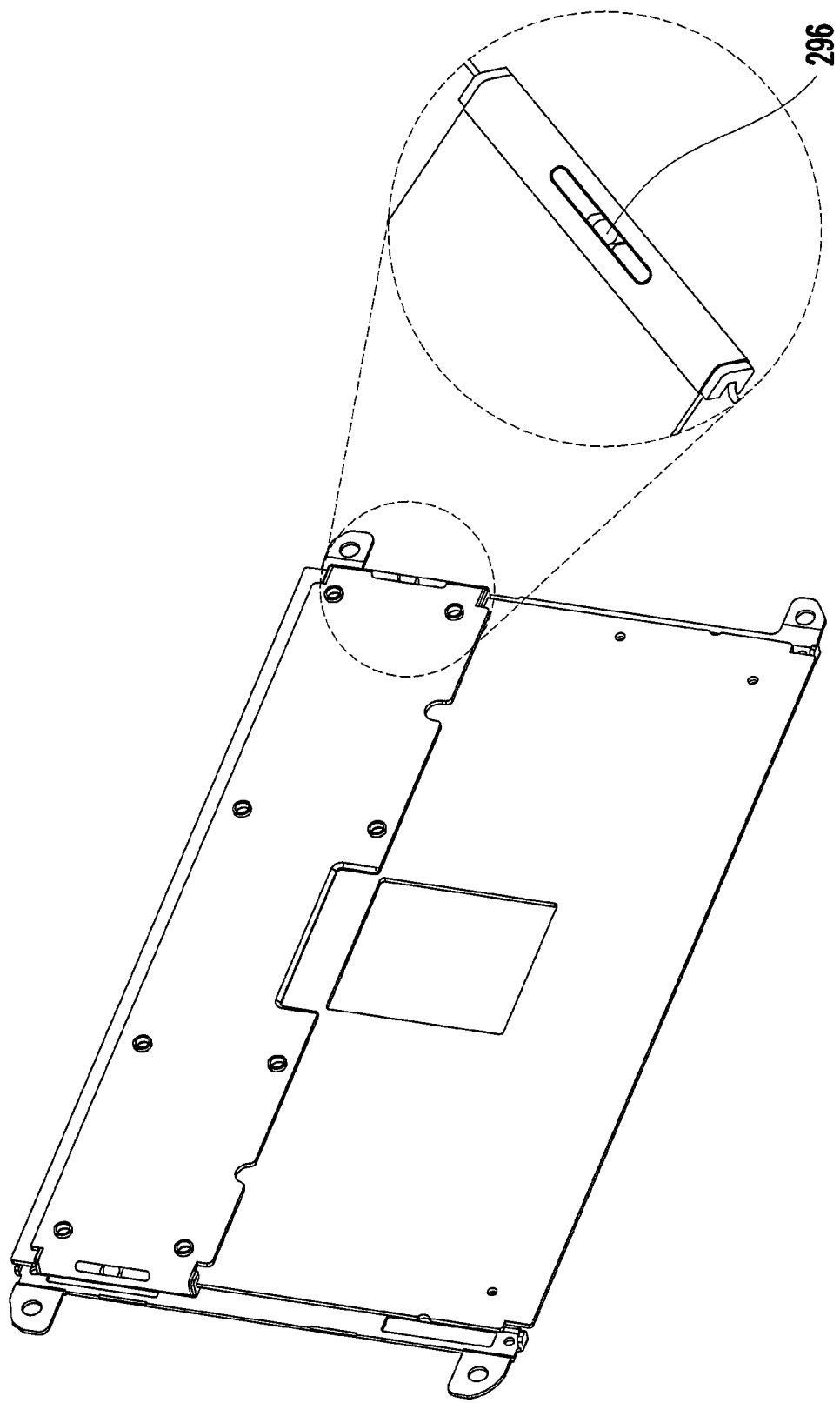
FIG. 18 is a three-dimensional schematic view of a handheld electronic device of yet another embodiment of the invention.
Figure 19:
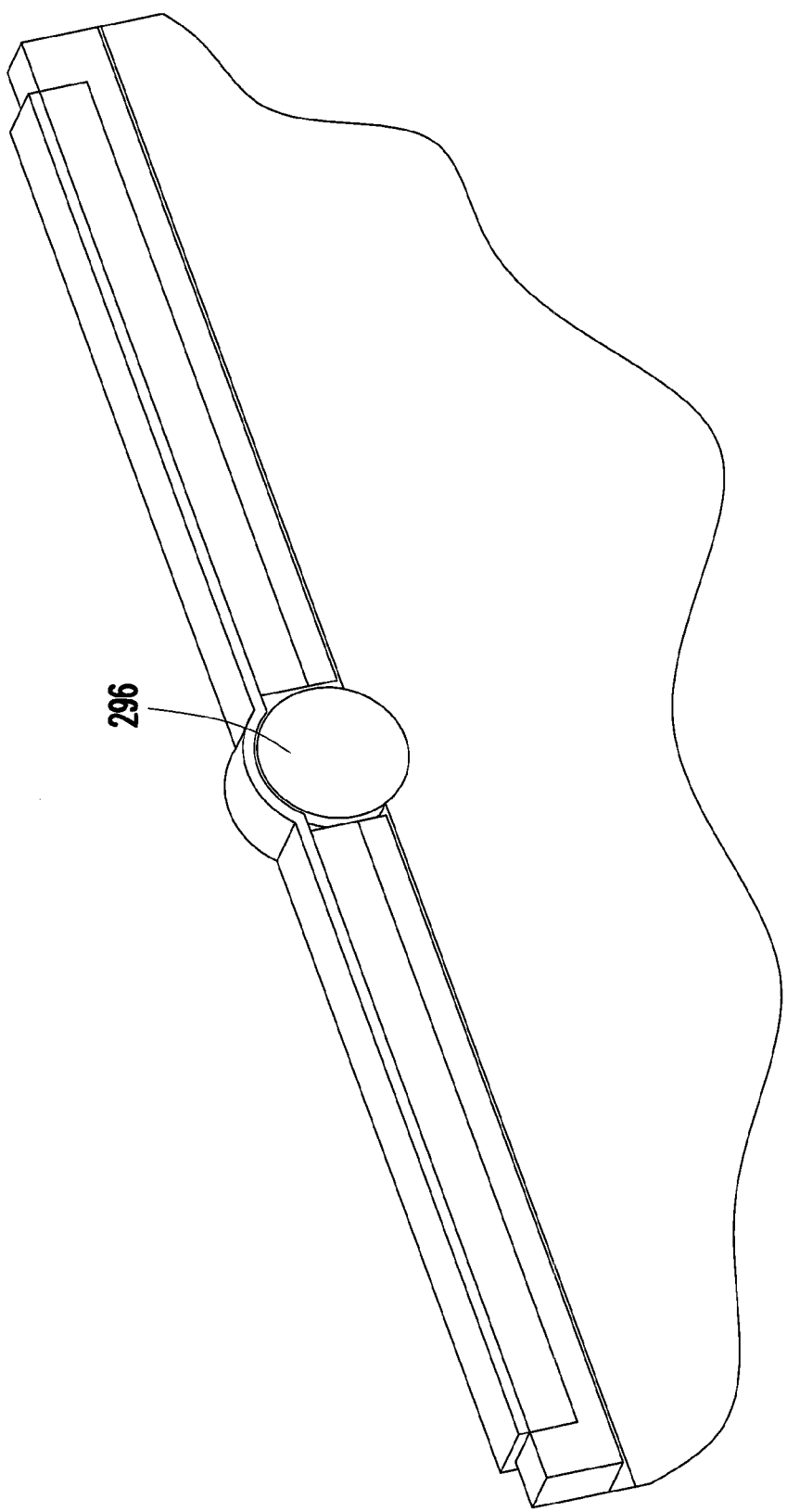
FIG. 19 illustrates a partial cross-sectional structure of the handheld electronic device of FIG. 18.

FIG. 18 is a three-dimensional schematic view of a handheld electronic device of yet another embodiment of the invention. FIG. 19 illustrates a partial cross-sectional structure of the handheld electronic device of FIG. 18. The main difference between the embodiment and the embodiment of FIGS. 16 and 17 is the ball 286 is switched with a roller 296. Components and configurations are similar to the previous embodiment, so repeated description is omitted.

Simply put, the embodiment of FIGS. 16-19 uses a rolling member combined with the locating structure of the sliding mechanism to achieve the locating effect of the previous embodiments. The locating recess 282 is, for example, a circular recess matched with the outer shape of the ball 286 or the roller 296. In addition, the elastic piece 288 can have a concave portion 288a that corresponds with the ball 286 or the roller 296, to limit the position of the ball 286 or the roller 286 with the opening 284. Thus, the operation use and feel of the handheld electronic device is improved, and the two bodies can stably present different operating states, such as a retracted state or an expanded state. Further, in the embodiment, when the ball 286 or the roller 296 is not in a locking position it can lean against the rib 214, to maintain the gap between the first plate 210 and the second plate 220. In other words, in the majority of the moving path, the ball 286 and the roller 296 will lean against the rib 214, assuring that no loosening or wavering action will happen between the first plate 210 and the second plate 220. This improves the operation stability of the handheld electronic device.

Based on the above, the sliding mechanism and the locating structure located on the moving path of the two bodies provided in the application help the user manually operate the handheld electronic device, and stably present different operation states, such as a retracted state or an expanded state. By omitting members such as the elastic member or the linkage, the application is advantageous towards the lightness and thinness of the handheld electronic device. Also, the simplicity of the sliding mechanism design is more reliable, and can lengthen the life-span of the handheld electronic device, and will decrease the manufacturing cost of the handheld electronic device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A handheld electronic device, comprising:
a first body including a first plate, wherein the first plate has a sliding slot and a rib, and the rib is transversely disposed in the sliding slot and extended along the sliding slot; a second body, stacked with the first body, wherein the sliding slot faces the second body, the second body includes a second plate, an edge of the second plate has a sliding block, and the sliding block is lodged in the sliding slot and comprises a bottom plate, connected to the edge of the second plate; a side wall, disposed upright on an edge of the bottom plate; mad a top plate, connected to the side wall, wherein the top plate and the bottom plate are substantially parallel to each other, to jointly clamp the rib so that the second plate is adapted to move along the sliding slot; driving the first body and the second body to be completely stacked or to be mutually away from each other, respectively forming a retracted state or an expanded state; a first locating structure, disposed in the sliding slot, wherein the first locating structure is located on a moving path of the sliding block; and a second locating structure, disposed on the sliding block, wherein the second locating structure is adapted to be interfered with the first locating structure on a locking position of the moving path.

2. The handheld electronic device as claimed in claim 1, wherein the second locating structure includes a locating recess located on the sliding block and facing the sliding slot, the first locating structure includes an elastic piece, and two ends of the elastic piece are fixed on the first plate, the elastic piece includes a protruding portion suspended between the two ends, and the protruding portion is adapted to engage the locating recess on the locking position.

3. The handheld electronic device as claimed in claim 2, wherein the protruding portion includes a convex hull formed through a bending of the elastic piece.

4. The handheld electronic device as claimed in claim 2, wherein the elastic piece is located on the outer side of the sliding slot, and the protruding portion of the elastic piece passes through an opening of the first plate, entering into the sliding slot.

5. The handheld electronic device as claimed in claim 2, wherein the locating recess is located on the top plate, and the locating recess faces a direction perpendicular to a planar direction of the top plate.

6. The handheld electronic device as claimed in claim 2, wherein the locating recess is located on the top plate, and the locating recess faces a direction parallel to a planar direction of the top plate.

7. The handheld electronic device as claimed in claim 1, wherein the first locating structure includes a locating hole located on the first plate, and the locating hole exposes the sliding slot, the second locating structure includes an elastic piece, the elastic piece is located in the sliding slot and has a protruding portion facing the first plate, and the protruding portion is adapted to engage the locating hole on the locking position.

8. The handheld electronic device as claimed in claim 7, wherein the protruding portion includes a convex hull formed through a bending of the elastic piece.

9. The handheld electronic device as claimed in claim 7, wherein the protruding portion is adapted to press against an inner wall of the sliding slot on the moving path other than the locking position.

10. The handheld electronic device as claimed in claim 1, wherein the first locating structure includes a locating recess located on the rib, and the second locating structure includes an opening and an elastic piece located on the sliding block, the opening exposes the rib, and the elastic piece is located on the outer side of the sliding block, two ends of the elastic piece are fixed on the sliding block at the two sides of the opening, and the elastic piece includes a protruding portion suspended between the two ends, and the protruding portion is located in the opening and adapted to engage the locating recess on the locking position.

11. The handheld electronic device as claimed in claim 10, wherein the protruding portion includes a convex hull formed through a bending of the elastic piece.

12. The handheld electronic device as claimed in claim 10, wherein when the protruding portion is not in the locking position, the protruding portion presses against rib.

13. The handheld electronic device as claimed in claim 1, wherein when the second locating structure is in the locking position and interferes with the first locating structure, the first body and the second body are completely stacked, forming the retracted state.

14. The handheld electronic device as claimed in claim 1, wherein when the second locating structure is in the locking position and interferes with the first locating structure, the first body and the second body are away from each other, forming an expanded state.

15. The handheld electronic device as claimed in claim 1, wherein the first locating structure includes a locating recess located on the rib, and the second locating structure includes an opening located on the sliding block, a rolling member located in the opening, and an elastic piece leaning against the rolling member, the opening exposes the rib, the elastic piece is located on the outer side of the sliding block and covers at least a portion of the opening, and two ends of the elastic piece are fixed on the sliding block at the two sides of the opening, to exert a force on the rolling member towards the rib, causing the rolling member to engage the locating recess on the locking position.

16. The handheld electronic device as claimed in claim 15, wherein the rolling member includes a ball or a roller, and the locating recess is a circular recess matched with the outer shape of the rolling member.

17. The handheld electronic device as claimed in claim 15, wherein the rolling member is adapted to press against the rib on the moving path other than the locking position.

* * * * *